United States Patent [19]

Norell

[11] Patent Number: 4,938,943
[45] Date of Patent: Jul. 3, 1990

[54] PROCESS FOR PRODUCTION OF CHLORINE DIOXIDE

[75] Inventor: Maria Norell, Linjevägen, Sweden

[73] Assignee: Eka Nobel AB, Surte, Sweden

[21] Appl. No.: 418,977

[22] Filed: Oct. 10, 1989

Related U.S. Application Data

[63] Continuation of Ser. No. 7/268,466, Nov. 8, 1988, abandoned.

[30] Foreign Application Priority Data

Jun. 17, 1988 [SE] Sweden ................................ 8802273

[51] Int. Cl.$^5$ ......................... C01B 11/02; C01B 17/74
[52] U.S. Cl. ..................................... 423/478; 423/532
[58] Field of Search ............... 423/478, 522, 530, 532, 423/551

[56] References Cited

U.S. PATENT DOCUMENTS

| | | |
|---|---|---|
| 378,774 | 2/1888 | Grousilliers ........................... 423/530 |
| 3,563,702 | 2/1971 | de Vere Partridge et al. ..... 423/478 |
| 3,864,456 | 2/1975 | Winfield et al. ...................... 423/478 |
| 3,933,988 | 1/1976 | Rosen .................................... 423/480 |
| 4,081,520 | 3/1978 | Swindells et al. .................... 423/478 |
| 4,145,401 | 3/1979 | Swindells et al. .................... 423/478 |
| 4,465,658 | 8/1984 | Fredette ................................ 423/478 |
| 4,473,540 | 9/1984 | Fredette ................................ 423/478 |

FOREIGN PATENT DOCUMENTS 274873 8/1913 Fed. Rep. of Germany .
128302 6/1919 United Kingdom ................ 423/532

*Primary Examiner*—Jeffrey E. Russel
*Attorney, Agent, or Firm*—Burns, Doane, Swecker & Mathis

[57] ABSTRACT

The present invention relates to a process for production of chlorine dioxide by reacting in a reaction vessel an alkali metal chlorate, sulfuric acid and a reducing agent, preferably methanol, in proportions to generate chlorine dioxide in a reaction medium maintained at a temperature from about 50° C. to about 100° C. and an acidity within the interval from 4.8 to 11 N and subjected to a subatmospheric pressure sufficient to effect evaporation of water. A mixture of chlorine dioxide and water vapour is withdrawn from an evaporation region in the reaction vessel and alkali metal sulfate is precipitated in a crystallization region in the reaction vessel. The alkali metal sulfate, which is an alkali metal sesquisulfate, from the crystallization region is heated to the formation of gaseous sulfur trioxide and a neutral alkali metal sulfate. The gaseous sulfur trioxide is absorbed in water to the formation of sulfuric acid. The sulfuric acid formed can be recirculated to the reaction vessel for chlorine dioxide production.

7 Claims, No Drawings

PROCESS FOR PRODUCTION OF CHLORINE DIOXIDE

This application is a continuation of application Ser. No. 07/268,466, filed Nov. 8, 1988, now abandoned.

The present invention relates to a process for production of chlorine dioxide from an alkali metal chlorate, sulfuric acid and a reducing agent. The process is carried out in a vessel operated under subatmospheric pressure, whereby water is evaporated and withdrawn together with chlorine dioxide and an alkali metal salt of the sulfuric acid is crystallized in the reaction vessel and withdrawn therefrom. More exactly the invention relates to an improved treatment of the alkali metal salt precipitated by the sulfuric acid.

Chlorine dioxide used as an aqueous solution is of considerable commercial interest, mainly in pulp bleaching but also in water purification, fat bleaching, removal of phenols from industrial wastes, etc. It is therefore desirable to provide processes by which chlorine dioxide can be efficiently produced.

The predominant chemical reaction involved in such processes is summarized by the formula $$ClO_3^- + Cl^- + 2H^+ \rightarrow ClO_2 + \tfrac{1}{2}Cl_2 + H_2O \qquad [1]$$

The chlorate ions are provided by alkali metal chlorate, preferably sodium chlorate, the chloride ions by alkali metal chloride, preferably sodium chloride, or by hydrogen chloride, and the hydrogen ions are provided by mineral acids, normally sulfuric acid and/or hydrochloric acid. As a by-product the alkali metal salt of the mineral acid is formed.

Processes for producing chlorine dioxide are described in e.g. U.S. Pat. Nos. 3563702 and 3864456, which are hereby incorporated by reference, comprising continuously feeding to a single vessel generator-evaporator-crystallizer an alkali metal chlorate, an alkali metal chloride, as a reducing agent, and mineral acid solutions in proportions sufficient to generate chlorine dioxide and chlorine, at a temperature of from about 50 to about 100° C., and an acidity of from about 2 to about 12 normal, with or without a catalyst, removing water by vacuum-induced evaporation at about 100–400 mm Hg absolute, with concurrent withdrawal from the reactor of chlorine dioxide and chlorine as well as the crystals obtained after crystallization of the salt of the mineral acid.

In those reaction systems wherein the acid normality is maintained between about 2 and 4.8, the reaction may be carried out in the presence of a relatively small amount of a catalyst, such as those selected from the group consisting of vanadium pentoxide, silver ions, manganese ions, dichromate ions and arsenic ions.

It is also known to use other reducing agents, which do not produce chlorine as a by-product. In U.S. Pat. No. 3933988 sulfur dioxide is used as a reducing agent and in U.S. Pat. Nos. 4081520, 4145401, 4465658 and 4473540 methanol is used as a reducing agent.

When methanol is used as a reducing agent the reaction ideally proceeds according to the formula $$6NaClO_3 + CH_3OH + 4H_2SO_4 \rightarrow 6ClO_2 + CO_2 + 5H_2O + 2Na_3H(SO_4)_2 \qquad [2]$$

However, the direct reaction between chlorate ions and methanol is very slow and the true reducing agent in this case is chloride ions reacting according to [1]. The chlorine formed is then reacting with methanol to regenerate chloride ions according to the formula $$CH_3OH + 3Cl_2 + H_2O \rightarrow 6Cl^- + CO_2 + 6H^+ \qquad [3]$$

Thus, it is often necessary to continuously add a small amount of chloride ions in order to obtain a steady production.

When chlorine dioxide production is effected at an acidity between about 4.8 and about 11 the sesquisulfate of the alkali metal, $Na_3H(SO_4)_2$, is precipitated in the crystallization.

The sodium sulfate obtained from the process, which is a by-product in chlorine dioxide production, is above all utilized as a makeup chemical in pulp production. In the production of pulp according to the sulfate method the active chemicals are sodium sulfide and sodium hydroxide. After dissolution of lignine the pulp is separated from the so called black liquor. This is concentrated and provided with sodium sulfate as a makeup for the sodium sulfide consumed. The black liquor is then evaporated and burned in a furnace, the recovery furnace, in order to recover sodium carbonate and sodium sulfide therein. The sodium sulfate added is hereby transformed to sodium sulfide according to the formula $$Na_2SO_4 + 2C \rightarrow Na_2S + 2CO_2 \qquad [4]$$

where the coal comes from organic wooden material extracted during boiling. The chemicals recovered from the black liquor are reused in the process.

The sodium sesquisulfate obtained from the chlorine dioxide process according to formula [2] contains 18% sulfuric acid. The crystallization of sulfate therefore leads to a loss of sulfuric acid in chlorine dioxide production. This sulfuric acid has to be compensated with fresh acid.

Before the sodium sulfate is used in the black liquor in pulp production it has to be neutralized, which consumes alkali. If an acidic salt is added, hydrogen sulfide is formed, which apart from being poisonous also might cause explosions in the process.

The present invention as it appears from the claims now presents a process to avoid the disadvantages caused by the acidic salt cake from the chlorine dioxide process. It is preferred to use the process according to the invention in chlorine dioxide production with methanol as a reducing agent.

According to the invention the acidic salt cake is heated to between 400 and 600° C., preferably to between 440 and 500° C. Surprisingly it has appeared that the salt cake decomposes into a neutral sulfate and gaseous sulfur trioxide according to the formula $$2Na_3H(SO_4)_2 \rightarrow 3Na_2SO_4(s) + SO_3(g) + H_2O(g) \qquad [5]$$

The neutral sulfate can be directly used as a makeup chemical in the black liquor without a preceding neutralization with a decreased alkali consumption for the paper maker as a consequence.

The sulfur trioxide gas is absorbed in water and forms sulfuric acid, which can be recirculated to the chlorine dioxide reactor or be used as an acidifying agent in the prebleaching of pulp. An optimal pH in this process is about 2. The pulp is slightly alkaline and therefore an acid must be added in order to obtain an optimal pH. The amount of acid required depends on the amount of chlorine in the bleaching step as chlorine has an acidifying effect. However, the use of chlorine in the bleaching of pulp is decreasing because of environmental reasons, which causes the amount of acid required to increase. The mother liquor can also be used in soap cleaving of fatty acids and resin acids, which are separated in the evaporation of black liquor from pulp boiling, in which tall oil is recovered.

The invention is appropriately performed so that the acidic salt cake from the filter of the chlorine dioxide reactor is washed in a normal way and is passed to a dryer, where the humidity is reduced from 5–15% to 0.01–5% by heating to 90°–180° C. This predryer can be designated as a rotating drum dryer, as a belt dryer, a fluidized bed dryer or another appropriate device for an efficient evaporation of remaining humidity. The dryer can advantageously be provided with a return flow of already dried sodium sesquisulfate in order to avoid caking of moist crystals on walls and heat transfer areas.

From the predryer warm sesquisulfate, principally free from humidity, is passed to a furnace for heating to an elevated temperature between 400° to 600° C., preferably between 440° and 500° C.

The furnace as well as the predryer can be provided with electric heating, steam or hot oil heating. Drying can be effected with hot air, hot inert gas or with infrared heating. The furnace can be working batchwise or continuously with a stationary or or movable bed of sodium sesquisulfate. Evolved gases can be removed by blowing with air, inert gas or steam or by applying a vacuum.

The hot neutral salt cake obtained by the chemical reaction in the furnace can advantageously be cooled by air or inert gas, which thereby is heated and can be used for blowing the furnace for removal of evolved $SO_3$ and $H_2O$ as above.

The furnace is appropriately dimensioned for a degree of conversion of 70–100% of theoretical conversion according to reaction [5]. Preferably the degree of conversion should exceed 85%, which is obtained by dimensioning the solid phase volume and flow through the furnace, or alternately the time of residence for a batch furnace, in a proper relation to the speed of reaction.

The invention is exemplified by the following examples, where the statements of percentage means % by weight.

EXAMPLE

A chlorine dioxide reactor was working according to the SVP®-methanol-process (SVP=single vessel process) with a production of 90 g $ClO_2$/h. The production of $Na_3H(SO_4)_2$ was 124 g/h. When heated in a furnace to 458° C. a gas evolution of 19 g $SO_3(g)$/h and 5 g/h water vapour was obtained. The solid residue in the furnace was found to be $Na_2SO_4(s)$, which was obtained in a flow of 100 g/h.

The gaseous phase was passed to an absorption tower where it was countercurrently contacted with water in a flow of 19 g/h. At the bottom of the absorption tower 55% $H_2SO_4$ in a flow of 43 g/h was obtained. When this sulfuric acid was recirculated to the chlorine dioxide reactor a decreased consumption of acid from 164 g/h of 55% $H_2SO_4$ to 121 g/h was obtained, which means 25% saving of sulfuric acid.

When using the salt cake as an additive to the recovery of chemicals in the pulp plant no sodium hydroxide is required for neutralization. When using an acidic salt cake an addition of 38 g/h of 50% sodium hydroxide was required for neutralization in order to avoid an evolution of sulfur dioxide and to obtain a balance in the ratio of Na/S in the pulp plant.

I claim:
1. A process for production of chlorine dioxide, comprising the steps of:
   (a) reacting in a reaction vessel an alkali metal chlorate, sulfuric acid and a reducing agent in proportions to generate chlorine dioxide in a reaction medium maintained at a temperature of from about 50° C. to about 100° C., having an acidity resulting in the formation of an alkali metal sulfate which consists of an alkali metal sesquisulfate and subjected to a subatmospheric pressure sufficient to effect evaporation of water;
   (b) withdrawing chlorine dioxide and water vapor from an evaporation region in the reaction vessel;
   (c) precipitating alkali metal sesquisulfate in a crystallization region of the reaction vessel; and
   (d) heating the precipitated alkali metal sesquisulfate to a temperature sufficient to form gaseous sulfur trioxide and a neutral alkali metal sulfate.

2. A process according to claim 1, including the step of absorbing the gaseous sulfur trioxide in water to form sulfuric acid.

3. A process according to claim 2, including the step of recycling the formed sulfuric acid to the reaction vessel for chlorine dioxide production.

4. A process according to claim 1, wherein the precipitated alkali metal sesquisulfate is heated to a temperature of from about 400° C. to about 600° C.

5. A process for production of chlorine dioxide, comprising the steps of:
   (a) reacting in a reaction vessel an alkali metal chlorate, sulfuric acid, and methanol as a reducing agent in proportions to generate chlorine dioxide in a reaction medium maintained at a temperature of from about 50° C. to about 100° C., having an acidity resulting in the formation of an alkali metal sulfate which consists of an alkali metal sesquisulfate and subjected to a subatmospheric pressure sufficient to effect evaporation of water;
   (b) withdrawing chlorine dioxide and water vapor from an evaporation region in the reaction vessel;
   (c) precipitating alkali metal sesquisulfate in a crystallization region of the reaction vessel; and
   (d) heating the precipitated alkali metal sesquisulfate to a temperature sufficient to form gaseous sulfur trioxide and a neutral alkali metal sulfate.

6. A process for production of chlorine dioxide, comprising the steps of:
   (a) reacting in a reaction vessel an alkali metal chlorate, sulfuric acid and methanol as a reducing agent in proportions to generate chlorine dioxide in a reaction medium maintained at a temperature of from about 50° C. to about 100° C., having an acidity resulting in the formation of an alkali metal sulfate which consists of an alkali metal sesquisulfate and subjected to a subatmospheric pressure sufficient to effect evaporation of water;
   (b) withdrawing chlorine dioxide and water vapor from an evaporation region in the reaction vessel;
   (c) precipitating alkali metal sesquisulfate in a crystallization region of the reaction vessel;
   (d) heating the precipitated alkali metal sesquisulfate to a temperature sufficient to form gaseous sulfur trioxide and a neutral alkali metal sulfate;
   (e) absorbing the gaseous sulfur trioxide in water to form sulfuric acid; and
   (f) recycling the sulfuric acid formed in step (e) to the reaction vessel for chlorine dioxide production.

7. A process according to claim 6, wherein said alkali metal is sodium.

* * * * *